United States Patent
Amadio

(10) Patent No.: US 11,675,207 B2
(45) Date of Patent: Jun. 13, 2023

(54) DYNAMICALLY CHANGING A FIDUCIAL MARKER FOR IOT DEVICE IDENTIFICATION

(71) Applicant: MICROSOFT TECHNOLOGY LICENSING, LLC, Redmond, WA (US)

(72) Inventor: Louis Amadio, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/392,169

(22) Filed: Aug. 2, 2021

(65) Prior Publication Data
US 2021/0364811 A1    Nov. 25, 2021

Related U.S. Application Data

(62) Division of application No. 16/664,766, filed on Oct. 25, 2019, now Pat. No. 11,099,402.

(51) Int. Cl.
*G06F 15/16* (2006.01)
*G02B 27/32* (2006.01)
*G02B 27/00* (2006.01)
*G02B 27/01* (2006.01)

(52) U.S. Cl.
CPC ......... *G02B 27/32* (2013.01); *G02B 27/0093* (2013.01); *G02B 27/017* (2013.01); *G02B 2027/014* (2013.01); *G02B 2027/0138* (2013.01)

(58) Field of Classification Search
None
See application file for complete search history.

(56) References Cited

U.S. PATENT DOCUMENTS

| 8,430,310 B1 * | 4/2013 | Ho .......................... G06F 21/35 |
| | | 235/382 |
| 10,380,580 B1 * | 8/2019 | Seetharam ....... G06K 19/06112 |
| 2009/0070936 A1 * | 3/2009 | Henderson ............... B25J 15/04 |
| | | 5/601 |

(Continued)

OTHER PUBLICATIONS

"Notice of Allowance Issued In European Patent Application No. 20801111.4", dated Feb. 10, 2023, 7 Pages.

*Primary Examiner* — Brian Whipple
*Assistant Examiner* — Gregory P Tolchinsky
(74) *Attorney, Agent, or Firm* — Newport IP, LLC; Jacob P. Rohwer

(57) ABSTRACT

The techniques described herein enable a head-mounted display device to use a fiducial marker to identify an Internet of Things (IoT) device. The head-mounted display device can use the identifier to establish a network connection with the IoT device. For example, the identifier can include an Internet Protocol (IP) address, a Bluetooth address, a cloud IoT identifier (e.g., AZURE hub IoT identifier), or another type of an identifier. By using an electronic paper display, the IoT device can dynamically generate and display a new fiducial marker when a new identifier is assigned to the IoT device or is generated by the IoT device. Consequently, the head-mounted display device can detect the fiducial marker and extract the identifier for the IoT device from the fiducial marker so that the identifier can be used to establish a network connection with the IoT device.

20 Claims, 10 Drawing Sheets

(56) References Cited

U.S. PATENT DOCUMENTS

| | | | | |
|---|---|---|---|---|
| 2013/0076491 | A1* | 3/2013 | Brandsma | H04W 52/0229 |
| | | | | 340/10.3 |
| 2016/0314120 | A1* | 10/2016 | Dauderman | G06F 16/907 |
| 2017/0359456 | A1* | 12/2017 | Shrubsole | G06F 3/017 |
| 2018/0308069 | A1* | 10/2018 | Starks | G06Q 10/063116 |
| 2020/0031656 | A1* | 1/2020 | Rudick | H04M 1/72415 |
| 2020/0042791 | A1* | 2/2020 | Fujinoi | G06V 20/20 |
| 2020/0042793 | A1* | 2/2020 | Gotow | G06F 21/6218 |
| 2020/0138207 | A1* | 5/2020 | Mishly | B65G 1/00 |
| 2020/0142942 | A1* | 5/2020 | Peri | H04L 65/1069 |
| 2020/0241733 | A1* | 7/2020 | Drake | A63F 13/25 |
| 2020/0372253 | A1* | 11/2020 | Jain | G06V 10/225 |

* cited by examiner

DYNAMICALLY CHANGING A FIDUCIAL MARKER FOR IOT DEVICE IDENTIFICATION

PRIORITY APPLICATION(S)

This application is a divisional of, and claims priority to, U.S. patent application Ser. No. 16/664,766, filed Oct. 25, 2019, and entitled "Dynamically Changing a Fiducial Marker for IoT Device Identification," the entire contents of which are incorporated herein by reference.

BACKGROUND

The use of Internet of Things (IoT) devices is becoming more prevalent, and thus, the exchange of information between IoT devices and other devices (e.g., a cloud server, a personal device, etc.) is improving the way in which people live. The exchange of information may occur via network connections (e.g., a Wi-Fi connection, a Bluetooth connection, etc.). Example IoT devices include: robotic devices, home appliance devices, temperature control devices, safety devices, security devices, wearable devices, entertainment devices, health care devices, medical instrumentation devices, automotive devices, agricultural devices, industrial devices, and so forth.

Head-mounted display devices (e.g., augmented reality devices, virtual reality devices, mixed reality devices, etc.) enable users to visually explore the IoT world around them via the use of an integrated image capture device. However, a head-mounted display device lacks the ability to efficiently identify an IoT device, amongst a plurality of different IoT devices, in an environment in which the head-mounted display device is being used, so that the head-mounted display device can establish communications with the IoT device. Moreover, a head-mounted display device lacks the ability to effectively locating an IoT device in an environment in which the head-mounted display device is being used.

It is with respect to these and other considerations the disclosure made herein is presented.

SUMMARY

The techniques disclosed herein enable a head-mounted display device to use a fiducial marker to identify an Internet of Things (IoT) device in an environment in which the head-mounted display device is being used. The head-mounted display device can use the identifier to establish a network connection with the IoT device. For example, the identifier can include an Internet Protocol (IP) address, a Bluetooth address, a cloud IoT identifier (e.g., AZURE hub IoT identifier), or another type of an identifier. The identifier may be assigned to the IoT device for network communications (e.g., by a service provider). Alternatively, the identifier may be generated by the IoT device for network communications.

A fiducial marker comprises a pattern from which a head-mounted display device can extract usable data. For instance, a fiducial marker can include a quick response (QR) code, a barcode (e.g., a high capacity color barcode), an augmented reality tag, an arUco marker, etc. In various examples, the pattern of the fiducial marker can include target points that are of a known shape (e.g., a square) and of a known size (e.g., physical dimensions such as one inch by one inch). Thus, the target points can be used by a computer vision algorithm executing on the head-mounted display device to determine an orientation and a position of the IoT device relative to the head-mounted display device in the environment.

Conventionally, a fiducial marker is either etched into an IoT device or printed and laminated on the IoT device, thereby making the fiducial marker static (i.e., incapable of being changed). This creates a problem for a head-mounted display device or another device that wants to communicate with the IoT device because the identifier usable to establish a network connection with the IoT device typically changes. In other words, the identifier is a temporary identifier. For instance, a new identifier (e.g., IP address, Bluetooth address, cloud IoT identifier, etc.) can be assigned or generated based on different events such as power cycles, sleep/wake cycles, changes in networks or network equipment being used (e.g., an access point), expired leases, etc.

As described herein, an IoT device is configured to display a fiducial marker via an electronic paper display. An electronic paper display comprises an electrically-charged surface that replicates the look and the experience of ink on paper based on "electrophoresis"—the movement of electrically charged molecules in an electric field. An electronic paper display only requires power when new image data is to be displayed. By using an electronic paper display, the IoT device can dynamically generate and display a new fiducial marker when a new identifier is assigned to the IoT device or is generated by the IoT device. Consequently, a head-mounted display device can detect the fiducial marker and extract the identifier for the IoT device from the fiducial marker so that the identifier can be used to establish a network connection with the IoT device.

Unlike conventional backlit flat panel displays that emit light, electronic paper displays are configured to reflect light. This provides a high contrast ratio that is ideal for computer vision because the fiducial marker can be detected within a wide field of view (e.g., the fiducial marker can be detected from more locations in the environment). Moreover, via the use of an electronic paper display, the fiducial marker can still be displayed even when the IoT device is asleep or turned off. This enables the IoT device to conserve power, yet still allows a head-mounted display device to establish a network connection that effectively powers on, or wakes up, the IoT device.

In various embodiments, the head-mounted display device can obtain, via the established network connection with the IoT device, a property of the IoT device. The property can include information with regard to what the IoT device is doing. This information can include, for example, an operating status, a task currently being performed, a type of physical object being stored, etc. In some implementations, the head-mounted display device can use the property to identify data to display in association with the IoT device. The head-mounted display device can use the orientation and the position of the IoT device in the environment relative to the head-mounted display device, determined based on the known shape and the known size of the target points in the fiducial marker, to display the data in association with the IoT device so that it appears the data is being projected on to the IoT device (e.g., like a hologram).

The techniques disclosed herein provide a number of features that improve existing computing devices. For instance, computing resources such as processor cycles, memory, network bandwidth, and power, are used more efficiently because an IoT device can sleep or power off, yet its identifier can still be exposed via the electronic paper display. This enables a device, such as a head-mounted display device, to still identify the IoT device while it is sleeping or powered off, and to establish a network connection. Other technical benefits not specifically mentioned herein can also be realized through implementations of the disclosed subject matter.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

The techniques described herein enable a device, such as a head-mounted display device, to use a fiducial marker to identify an Internet of Things (IoT) device. The head-mounted display device can use the identifier to establish a network connection with the IoT device. For example, the identifier can include an Internet Protocol (IP) address, a Bluetooth address, a cloud IoT identifier (e.g., AZURE hub IoT identifier), or another type of an identifier. By using an electronic paper display, the IoT device can dynamically generate and display a new fiducial marker when a new identifier is assigned to the IoT device or is generated by the IoT device. Consequently, the head-mounted display device can detect the fiducial marker and extract the identifier for the IoT device from the fiducial marker so that the identifier can be used to establish a network connection with the IoT device.

Figure 1:
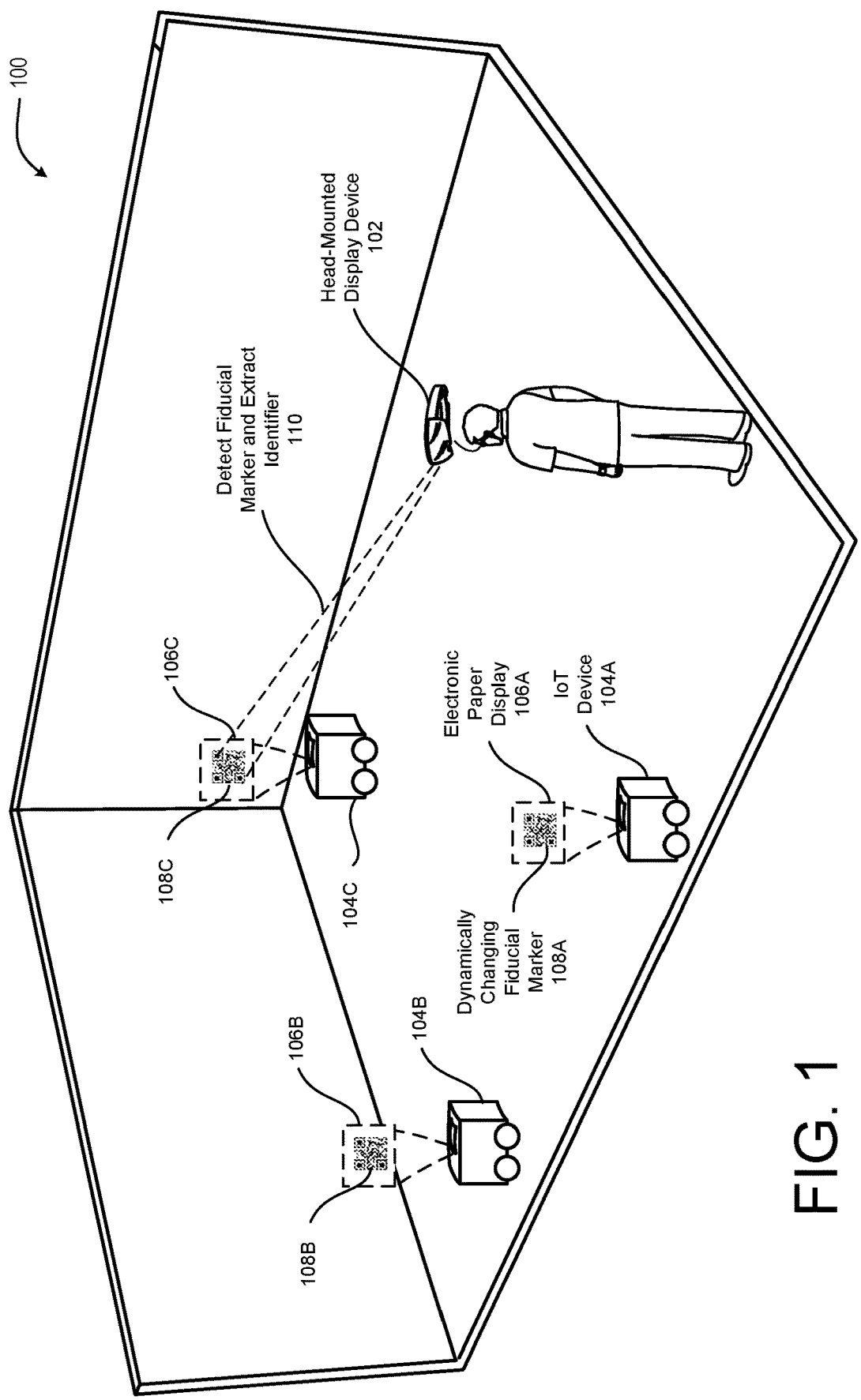
FIG. 1 illustrates an example scenario in which a head-mounted display device, being worn by a user, can identify an Internet of Things (IoT) device, from a plurality of IoT devices, using a fiducial marker.

FIG. 1 illustrates an example scenario 100 in which a head-mounted display device 102, being worn by a user, can identify an Internet of Things (IoT) device 104C, from a plurality of different IoT devices 104A-104C, using a fiducial marker. As shown, the IoT devices 104A-104C include electronic paper displays 106A-106C. In the example scenario 100, the electronic paper displays 106A-106C are configured on top of the IoT devices 104A-104C. However, the electronic paper displays 106-106C may be configured in different locations (e.g., front, back, either side, etc.) on the IoT devices 104A-104C so that the image data displayed via the electronic paper displays 106-106C can be exposed to other devices attempting to detect the image data (e.g., the head-mounted display device 102).

The electronic paper displays 106A-106C are configured to individually display different fiducial markers 108A-108C that dynamically change as identifiers used for communications change. As described above, the fiducial markers 108A-108C comprise patterns from which the head-mounted display device 102 can extract usable data. Examples of the fiducial markers 108A-108C can include quick response (QR) codes, barcodes (e.g., a high capacity color barcode), augmented reality tags, arUco markers, or other types of markers that are capable of encoding data such as a communication identifier.

The identifier can include an Internet Protocol (IP) address, a Bluetooth address, a cloud IoT identifier (e.g., AZURE hub IoT identifier), or another type of identifier that changes (e.g., is a temporary identifier). Identifiers may be assigned to the IoT devices 104A-104C for network communications (e.g., by a service provider). Alternatively, the identifiers may be generated by the IoT devices 104A-104C for network communications.

As described above, a fiducial marker is typically either etched into an IoT device or printed and laminated on the IoT device, thereby making the fiducial marker static (i.e., incapable of being changed). This creates a problem for the head-mounted display device 102 because the identifier usable to establish a network connection with a particular IoT device 104C typically changes over time based on different events such as power cycles, sleep/wake cycles, changes in networks or network equipment being used (e.g., an access point), expired leases, etc.

The use of electronic paper displays 106A-106C solves this problem because the electronic paper displays 106A-106C can be updated to reflect new identifiers. An electronic paper display comprises an electrically-charged surface that replicates the look and the experience of ink on paper based on "electrophoresis"—the movement of electrically charged molecules in an electric field. By using electronic paper displays 106A-106C, the IoT devices 104A-104C can dynamically generate and display new fiducial markers 108A-108C that encode new identifiers that are assigned to the IoT devices 104A-104C or that are generated by the IoT devices 104A-104C.

Unlike conventional backlit flat panel displays that emit light, electronic paper displays 106A-106C are configured to reflect light. This provides a high contrast ratio that is ideal for computer vision algorithms because the fiducial markers 108A-108C can be detected within a wide field of view (e.g., the fiducial markers 108A-108C can be detected from more locations in a physical environment). Moreover, via the use of electronic paper displays 106A-106C, the fiducial markers 108A-108C can still be displayed even when the IoT devices 104A-104C are asleep or turned off. This enables the IoT devices 104A-104C to conserve power, yet still allows a head-mounted display device 102 to establish network connections that effectively power on, or wake up, the IoT devices 104A-104C so information can be exchanged.

In the example scenario 100, the IoT devices 104A-104C are mobile robotic devices that can move throughout a physical environment in which they are co-located with the head-mounted display device 102 (e.g., a room in a house, an office in an office suite, an outside area such as a yard, a warehouse floor, etc.). However, it is understood in the context of this disclosure, that different types of IoT devices, both mobile and stationary, can display fiducial markers 108A-108C via electronic paper displays 106A-106C. Other example types of IoT devices include: home appliance devices, temperature control devices, safety devices, security devices, wearable devices, entertainment devices, health care devices, medical instrumentation devices, automotive devices, agricultural devices, industrial devices, and so forth. Furthermore, while the example scenario 100 illustrates three robotic devices, it is understood that an environment may include a different number of IoT devices (e.g., two, four, six, ten, twenty, etc.) and/or different types of IoT devices.

The head-mounted display device 102 is configured with an image capture device that can scan the physical environment, detect a fiducial marker 108C displayed via an electronic paper display 106C connected to an IoT device 104C, and extract the identifier 110 for the IoT device 104C from the fiducial marker 108C. For example, the head-mounted display device 102 can use a depth camera to extract the identifier 110 from the fiducial marker 108C. The physical environment can be scanned by infrared light, and based on the exposure of the fiducial marker 108C to a light source, the head-mounted display device 102 can sense reflected light and obtain the pattern (e.g., a two-dimensional pattern) of the fiducial marker 108C, and extract an identifier from the pattern.

Figure 2A:
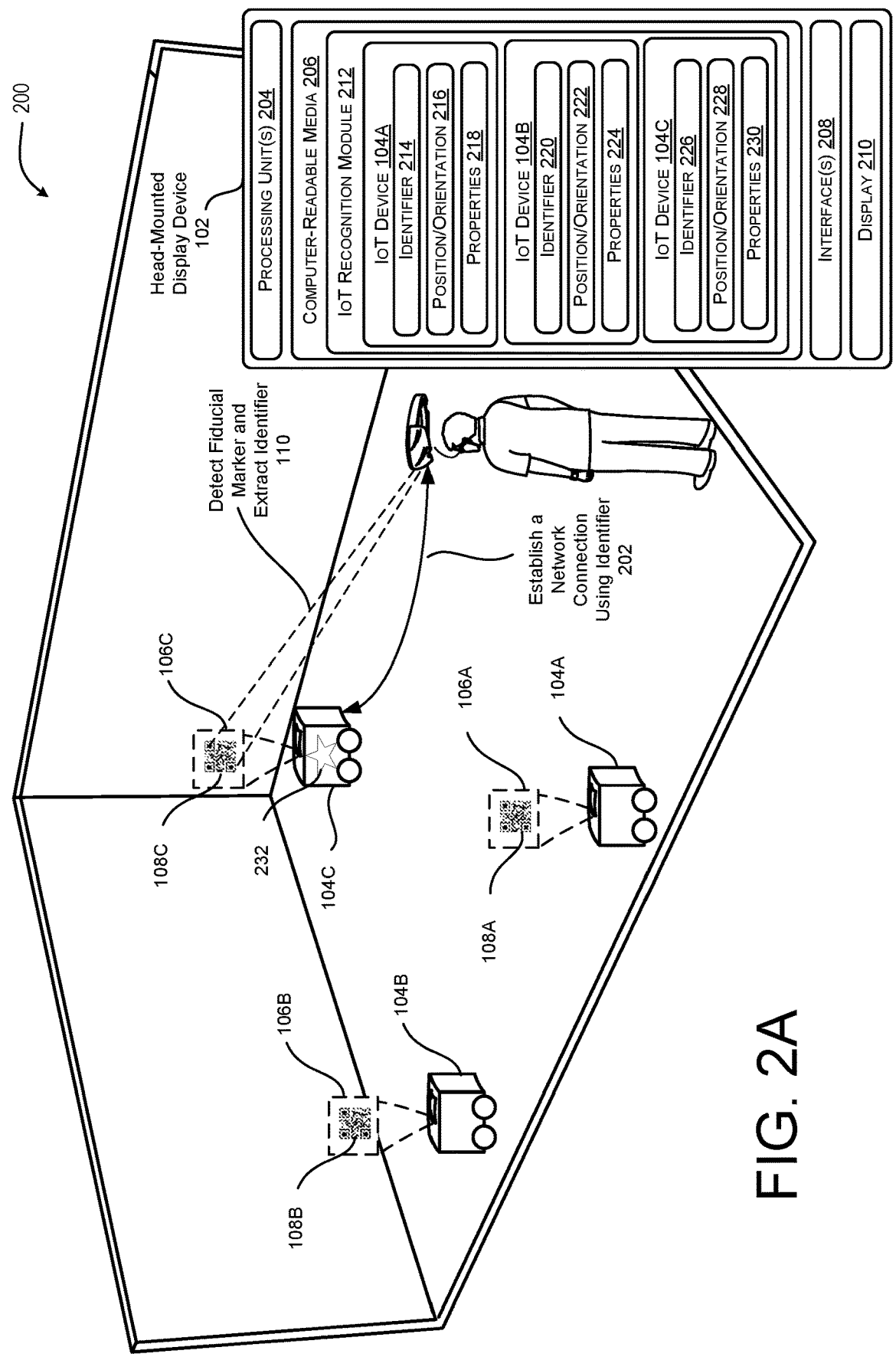
FIG. 2A illustrates an example scenario in which a head-mounted display device can use an identifier extracted from a fiducial marker, displayed via an electronic paper display, to establish a network connection with an IoT device.

The head-mounted display device 102 can use the extracted identifier 110 for the IoT device 104C in different ways. For instance, FIG. 2A illustrates an example scenario 200 in which the head-mounted display device 102 can use the extracted identifier 110 to establish a network connection 202 with the IoT device 104C. Via the established network connection 202 with the IoT device 104C, the head-mounted display device 102 can request and receive information about the IoT device 104C. This information can include properties such as an operating status, a task currently being performed, a type of physical object being stored, etc.

The head-mounted display device 102 can include data processing unit(s) 204, computer-readable media 206, communication interface(s) 208, and a display 210, details of which are further described herein. The computer-readable media 206 includes an IoT recognition module 212 configured to execute a computer vision algorithm that scans for fiducial markers 108A-108C, detects patterns of fiducial markers 108A-108C, and extracts identifiers from the patterns of the fiducial markers 108A-108C. This enables a user of the head-mounted display device 102 to explore the IoT world within a physical environment. More specifically, the user of the head-mounted display device 102 can be informed of the identifications of IoT devices 104A-104C that are located in the physical environment and know what the IoT devices 104A-104C are doing. Moreover, the user can use the head-mounted display device 102 to send commands or instructions to the IoT devices 104A-104C.

The patterns of the fiducial markers 108A-108C can include target points that are of a known shape (e.g., a square) and of a known size (e.g., physical dimensions such as one inch by one inch). For instance, a QR code contains alignment markers—three squares with smaller squares inside that are located on the corners of the QR code. These target points can be used by the computer vision algorithm executing on the head-mounted display device 102 to determine an orientation and a position of a particular IoT device 104C relative to the head-mounted display device 102 in the physical environment.

Consequently, FIG. 2A illustrates that the IoT recognition module 212 can obtain and store an identifier 214 for IoT device 104A, a position and an orientation 216 for IoT device 104A, and properties 218 for IoT device 104A. Via the detection of a fiducial marker, this information can be obtained and stored for any IoT device located in the physical environment. Therefore, the IoT recognition module 212 can obtain and store an identifier 220 for IoT device 104B, a position and an orientation 222 for IoT device 104B, and properties 224 of IoT device 104B. And the IoT recognition module 212 can obtain and store an identifier 226 for IoT device 104C, a position and an orientation 228 for IoT device 104C, and properties 230 of IoT device 104C.

In various examples, the IoT recognition module 212 can use a property 230 to identify data to display in association with the IoT device 104C. The IoT recognition module 212 can use the orientation and the position 228 of the IoT device 104C in the physical environment, determined based on the known shape and the known size of the target points in the fiducial marker 108C, to display the data in association with the IoT device 104C. As an example, FIG. 2A illustrates that a virtual star 232 is displayed on the IoT device 104C. The virtual star 232 may be displayed so that it appears to be projected on to the IoT device 104C (e.g., like a hologram).

Figure 2B:
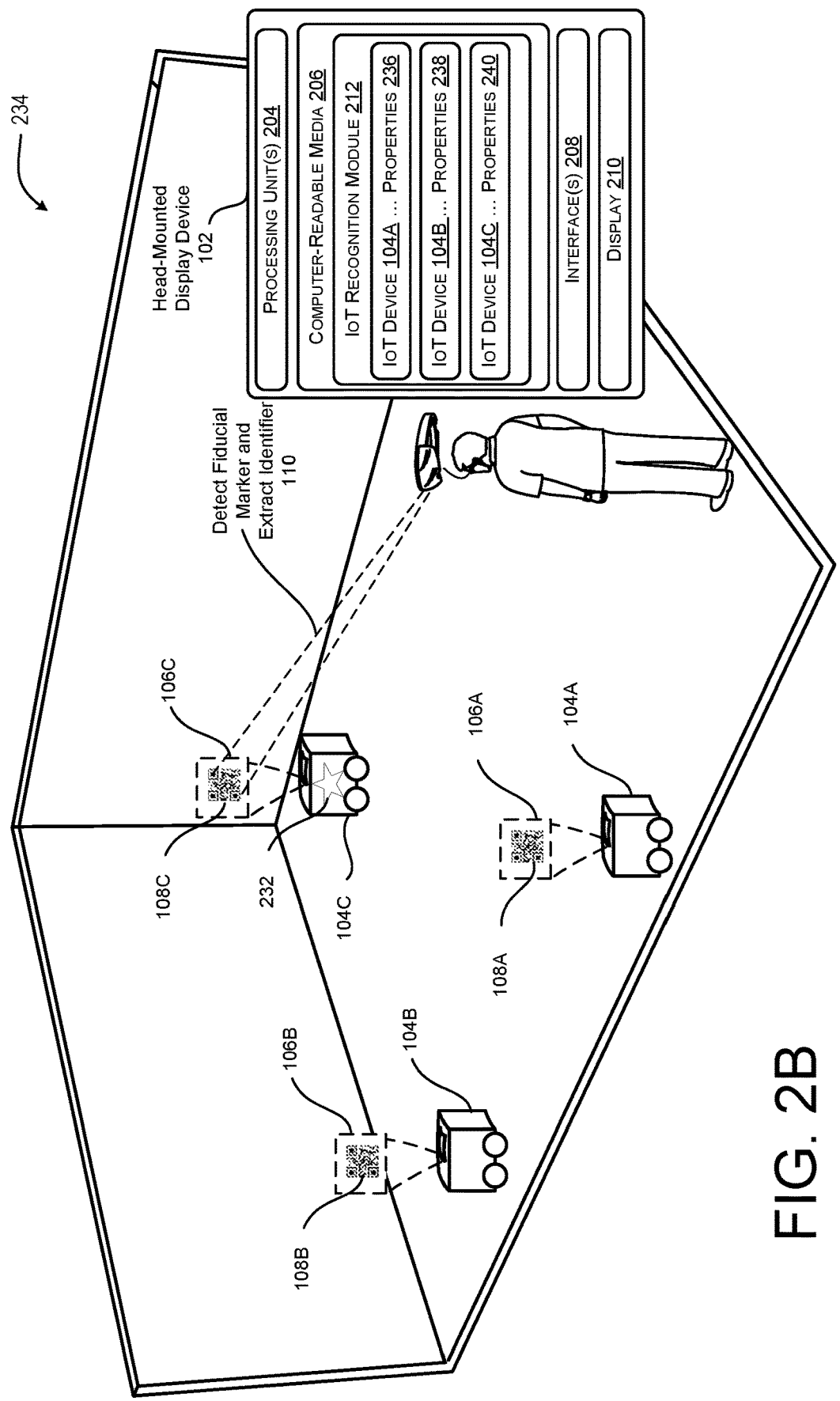
FIG. 2B illustrates an example scenario in which a head-mounted display device associates an extracted identifier with properties of an IoT device without establishing a network connection with the IoT device.

As an alternative embodiment to FIG. 2A, FIG. 2B illustrates an example scenario 234 in which the head-mounted display device 102 associates the identifier with properties of an IoT device. In this example scenario 234, the properties may be obtained via a source other than the IoT device (e.g., a network connection does not necessarily need to be established). For example, the source can be a database server referred to by the extracted identifier 110. Alternatively, the head-mounted display device 102 may store predetermined mappings that associate properties with an identifier. That is, the IoT recognition module 212 can include properties 236 that are mapped to IoT device 104A via an extracted identifier, properties 238 that are mapped to IoT device 104B via an extracted identifier, and properties 240 that are mapped to IoT device 104C via an extracted identifier.

While FIGS. 1-2B illustrate the use of a head-mounted display device 102 to extract identifiers from the fiducial markers 108A-108C, it is understood in the context of this invention that other devices equipped with, or in some way connected to, an image capture device can also be used.

These other devices can include traditional client-type devices such as a desktop computer, a game console and/or a gaming device, a tablet computer, a personal data assistant ("PDA"), a mobile phone/tablet hybrid, a laptop computer, a telecommunication device, a network-enabled television, a work station, a media player, a personal video recorder ("PVR"), a set-top box, a camera, or any other sort of computing device.

Figure 3:
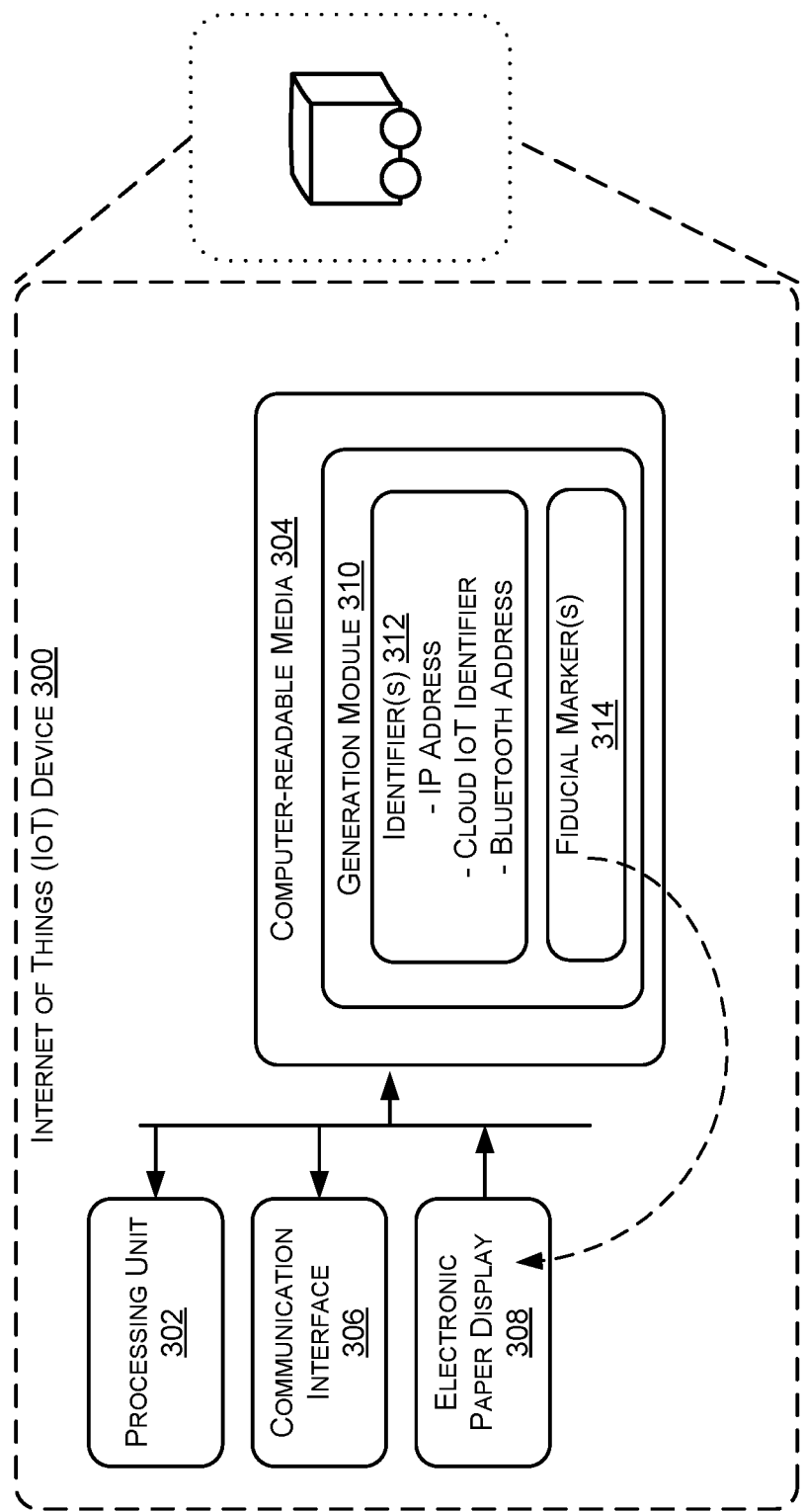
FIG. 3 illustrates an example IoT device, such as a robotic device.

FIG. 3 illustrates an example IoT device 300, such as a robotic device. Other types of IoT devices 300 include: home appliance devices, temperature control devices, safety devices, security devices, wearable devices, entertainment devices, health care devices, medical instrumentation devices, automotive devices, agricultural devices, industrial devices, and so forth.

The IoT device 300 includes a processing unit 302, computer-readable media 304, a communication interface 306, and an electronic paper display 308. The computer-readable media 304 includes a generation module 310 that is configured to obtain an identifier 312 from the communication interface 306 (e.g., an IP address, a cloud IoT identifier, a Bluetooth address, etc.) and to generate a fiducial marker 314 based on the identifier 312. The fiducial marker 314 can then be displayed on the electronic paper display 308. Moreover, a new fiducial marker 314 can be dynamically generated and displayed when a new identifier 312 is assigned to the IoT device 300, and the new fiducial marker 314 can replace a current fiducial marker being displayed via the electronic paper display 308.

The functionality described herein in association with the illustrated modules may be performed by a fewer number of modules or a larger number of modules. As utilized herein, processing unit(s), such as the processing unit(s) 204 and/or processing unit(s) 302, may represent, for example, a CPU-type data processing unit, a GPU-type data processing unit, a field-programmable gate array ("FPGA"), digital signal processors ("DSPs"), a microcontroller, or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 206 and computer-readable media 304, may store instructions executable by the processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator.

Computer-readable media, which might also be referred to herein as a computer-readable medium, may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s), such as communication interface(s) 208 and 306, may represent, for example, network interface controllers ("NICs") or other types of transceiver devices to send and receive communications over a network.

Figure 4:
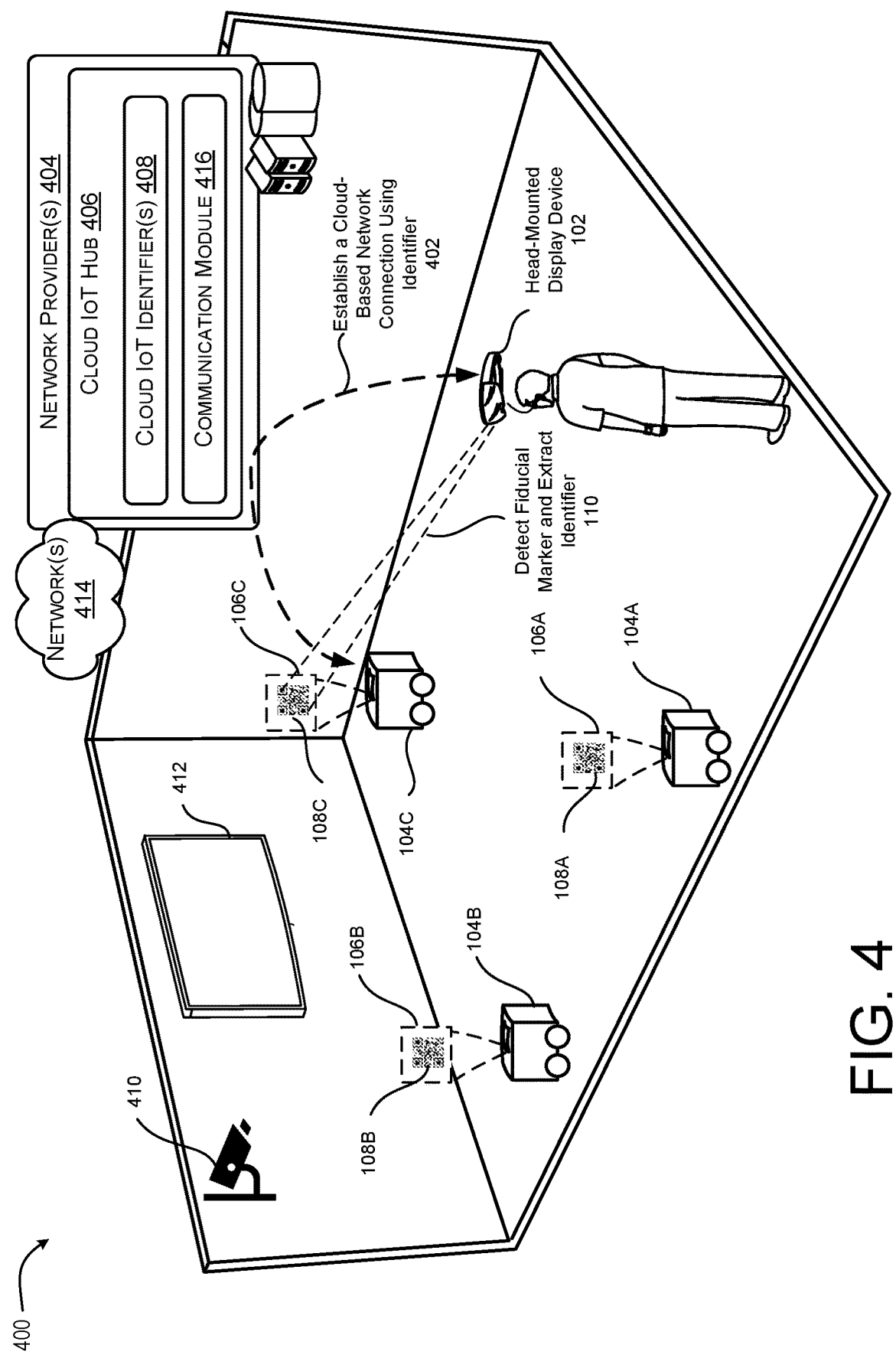
FIG. 4 illustrates an example scenario in which a head-mounted display device can use an identifier extracted from a fiducial marker, displayed via an electronic paper display, to establish a network connection with an IoT device via a cloud IoT hub service provided by a network provider.

FIG. 4 illustrates an example scenario 400 in which a head-mounted display device 102 can use an identifier 110 extracted from a fiducial marker 108C, displayed via an electronic paper display 106C, to establish a cloud-based network connection 402 with an IoT device 104C via a cloud IoT hub service provided by a network provider 404. The network provider 404 includes a cloud IoT hub 406. The cloud IoT hub 406 provides a cloud-hosted backend solution to connect a set of devices, including device authentication, device management, and scaled provisioning.

To this end, the cloud IoT hub 406 is configured to assign cloud IoT hub identifiers 408 to IoT devices 104A-104C, as well as IoT devices 410 and 412, connected to network(s) 414. Upon detection of the fiducial marker 108C on IoT device 104C, the head-mounted display device 102 can extract a cloud IoT hub identifier 408 and use the cloud IoT hub identifier 408 to establish the cloud-based network connection 402. Accordingly, the cloud IoT hub 406 uses a communication module 416 to implement the exchange of information via the cloud-based network connection 402.

Network(s) 414 may include, for example, public networks such as the Internet, private networks such as an institutional and/or personal intranet, or some combination of private and public networks. Network(s) 414 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, 5G and so forth) or any combination thereof. Network(s) 414 may utilize communications protocols, including packet-based and/or datagram-based protocols such as Internet protocol ("IP"), transmission control protocol ("TCP"), user datagram protocol ("UDP"), or other types of protocols. Moreover, network(s) 414 may also include a number of devices that facilitate network communications and/or form a hardware basis for the networks, such as switches, routers, gateways, access points, firewalls, base stations, repeaters, backbone devices, and the like.

In some examples, network(s) 414 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, 802.11ac and so forth), and other standards.

In various examples, the network provider 404 may include one or more computing devices (e.g., servers) that operate in a cluster or other grouped configuration to share resources, balance load, increase performance, provide failover support or redundancy, or for other purposes.

Figure 5:
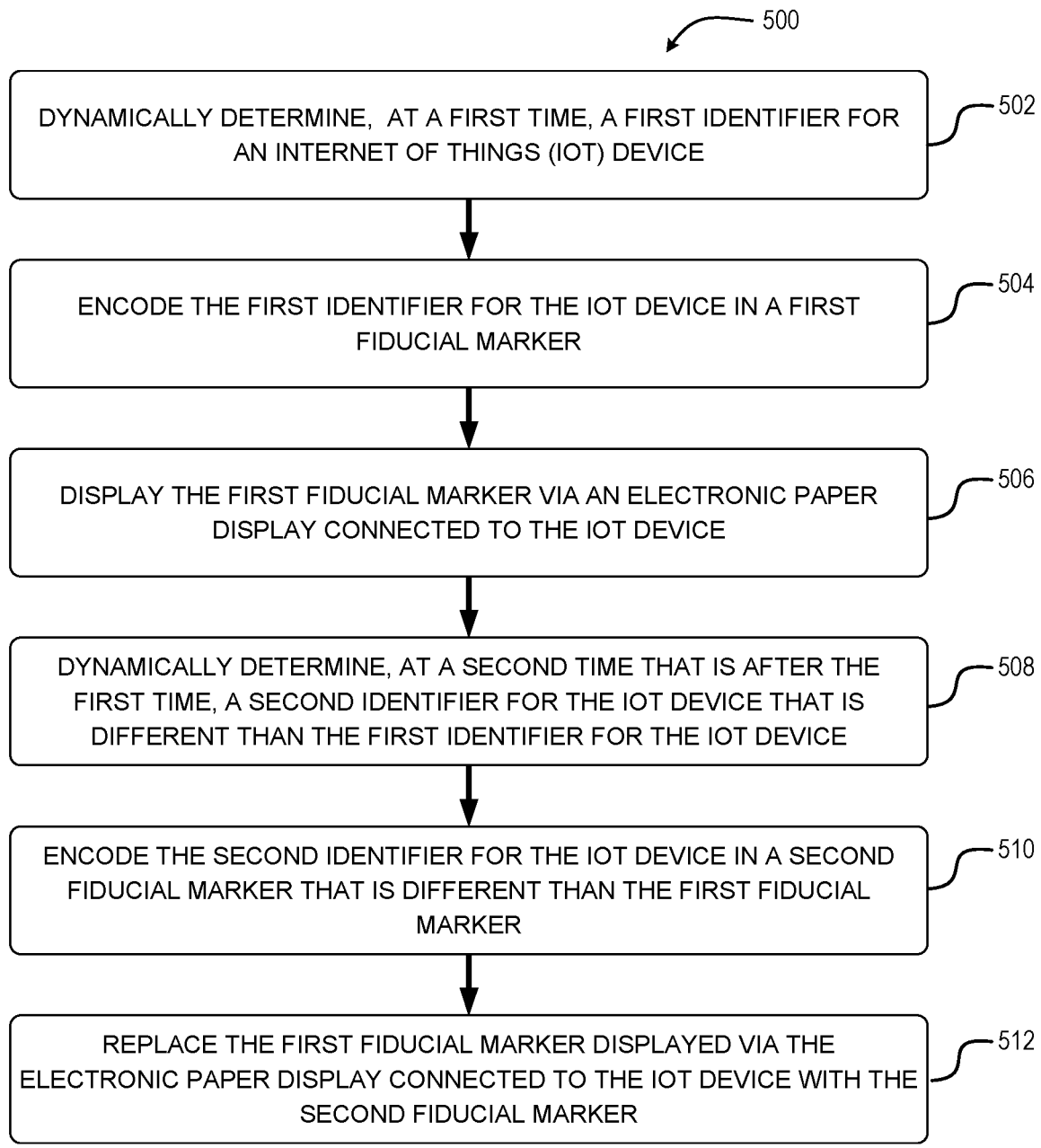
FIG. 5 is a flow diagram illustrating aspects of a sample routine for generating and displaying a fiducial marker on an electronic paper display of an IoT device.
Figure 6:
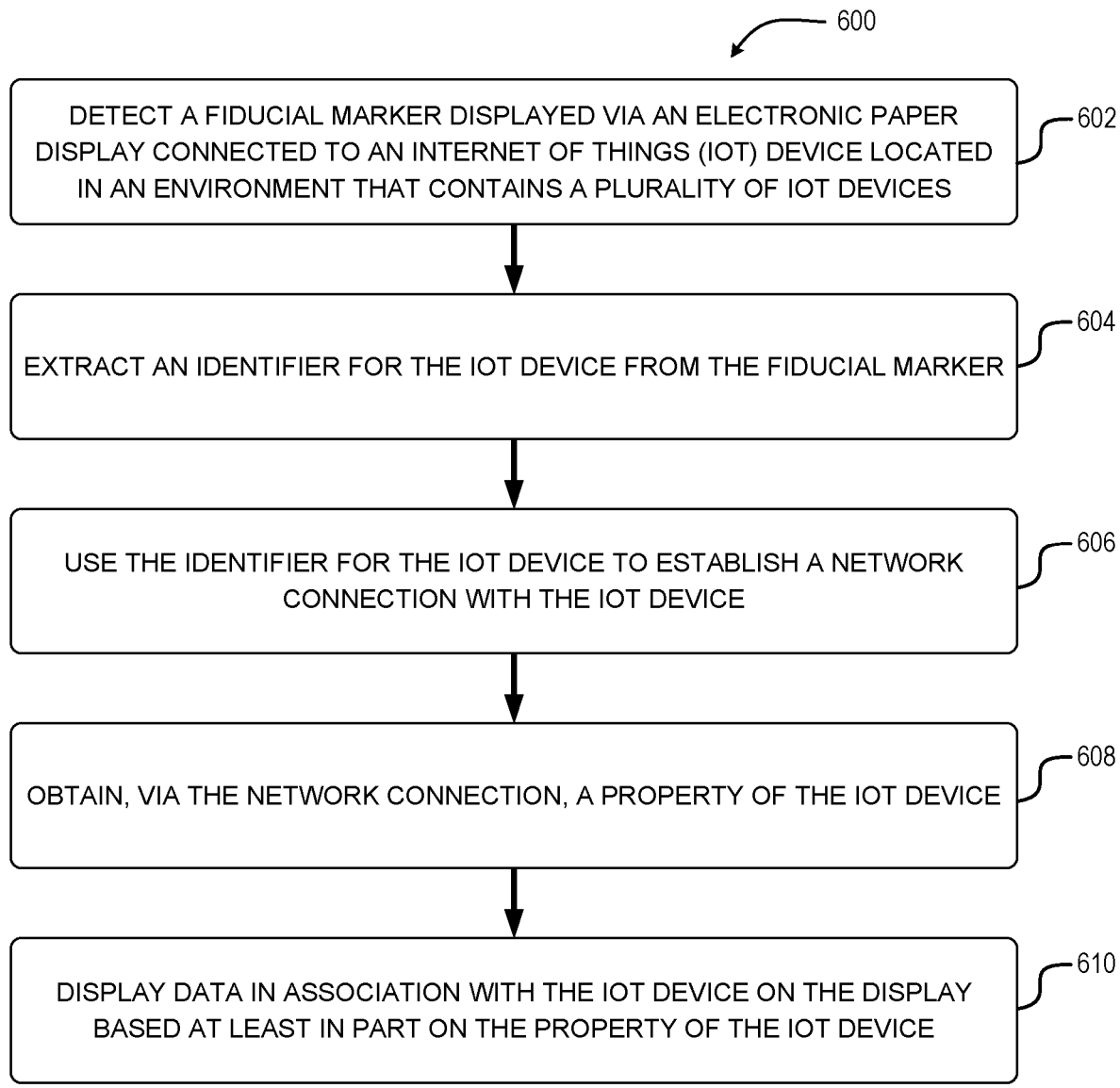
FIG. 6 is a flow diagram illustrating aspects of a sample routine for extracting an identifier from a fiducial marker, displayed via an electronic paper display, to establish a network connection with an IoT device.
Figure 7:
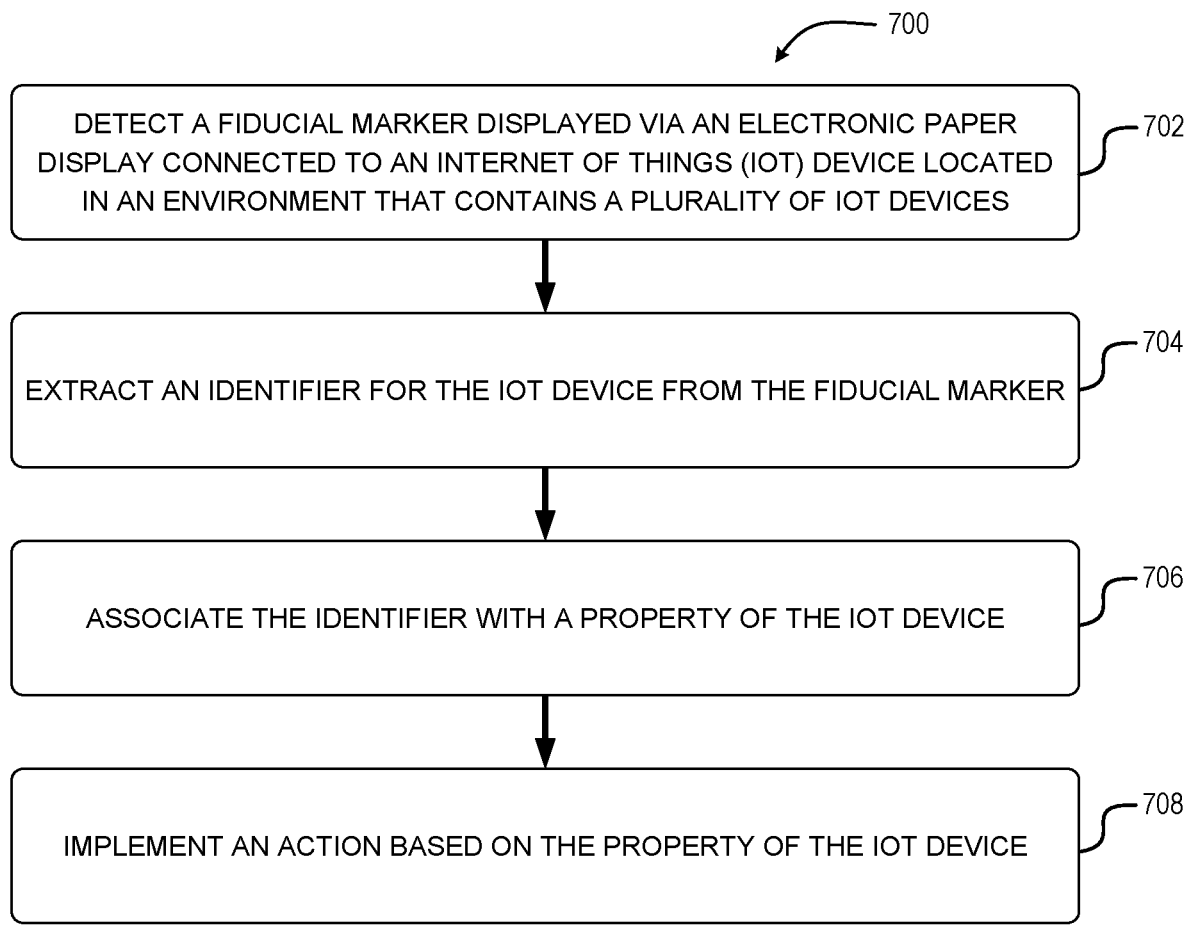
FIG. 7 is a flow diagram illustrating aspects of a sample routine for extracting an identifier from a fiducial marker, displayed via an electronic paper display, to determine a property associated with an IoT device.

FIG. 5 is a flow diagram illustrating routine 500 describing aspects of the present disclosure. In various examples, operations of the routine 500 can be performed by an IoT device (e.g., one of devices 104A-104C, 410, 412). FIGS. 6 and 7 are also flow diagrams illustrating routines 600, 700 for describing further aspects of the present disclosure. In various examples, operations of the routines 600, 700 can be performed by a device configured with a camera to detect the fiducial markers (e.g., a head-mounted display device 102) and/or a server that is part of a network provider. The logical operations described herein with regards to any one of FIGS. 5-7 can be implemented (1) as a sequence of computer implemented acts or program modules running on a computing device and/or (2) as interconnected machine logic circuits or circuit modules within a computing device.

For ease of understanding, the processes discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-readable media. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including processing units in single-processor or multiprocessor systems, minicomputers, mainframe computers, personal computers, head-mounted display devices, hand-held computing devices, microprocessor-based, programmable consumer electronics, combinations thereof, and the like.

For example, the operations of the routines 500, 600, 700 can be implemented by dynamically linked libraries ("DLLs"), statically linked libraries, functionality produced by an application programming interface ("API"), a compiled program, an interpreted program, a script, a network service or site, or any other executable set of instructions. Data can be stored in a data structure in one or more memory components. Data can be retrieved from the data structure by addressing links or references to the data structure.

Although the following illustrations may refer to components of the figures, it can be appreciated that the operations of the routines 500, 600, 700 may be also implemented in many other ways. For example, the routines 500, 600, 700 may be implemented, at least in part, by another remote computer, processor, or circuit. In addition, one or more of the operations of the routines 500, 600, 700 may alternatively or additionally be implemented, at least in part, by a chipset working alone or in conjunction with other software modules. In the examples described below, one or more modules of a computing system can receive and/or process the data disclosed herein. Any service, circuit, or application suitable for providing the techniques disclosed herein can be used in the operations described.

With reference to FIG. 5, the routine 500 begins at operation 502 where a first identifier is dynamically determined for an IoT device at a first time. The routine proceeds to operation 504 where the first identifier for the IoT device is encoded in a first fiducial marker. At operation 506, the first fiducial marker is displayed via an electronic paper display connected to the IoT device.

Then at operation 508, a second identifier, that is different than the first identifier, is dynamically determined for the IoT device at a second time after the first time. At operation 510, the second identifier for the IoT device is encoded in a second fiducial marker that is different than the first fiducial marker. Then, at operation 512, the first fiducial marker displayed via the electronic paper display connected to the IoT device is replaced with the second fiducial marker.

With reference to FIG. 6, the routine 600 begins at operation 602 where a fiducial marker displayed via an electronic paper display connected to an Internet of Things (IoT) device, located in a physical environment that contains a plurality of IoT devices, is detected by an image capture device (e.g., a camera). The image capture device may be configured as part of a head-mounted display device. At operation 604, an identifier for the IoT device is extracted from the fiducial marker. And at operation 606, the identifier for the IoT device is used to establish a network connection with the IoT device.

In various embodiments, at operation 608, a property of the IoT device is obtained via the network connection. At operation 610, data is displayed in association with the IoT device based at least in part on the property of the IoT device.

In some embodiments, an orientation and a position of the IoT device can be determined based on a known shape and a known size of a target point configured within the fiducial marker, and the data can be displayed using the orientation and the position of the IoT device.

With reference to FIG. 7, the routine 700 begins at operation 702 where a fiducial marker displayed via an electronic paper display connected to an Internet of Things (IoT) device, located in a physical environment that contains a plurality of IoT devices, is detected by an image capture device. At operation 704, an identifier for the IoT device is extracted from the fiducial marker. At operation 706, the identifier is associated with a property of the IoT device. And at operation 708, an action is implemented based on the property of the IoT device.

For instance, the action may include docking a device (e.g., a robotic device) to an IoT cart that stores a particular type of object referenced by an identifier extracted from a fiducial marker. The robotic device may be manufactured to move the IoT cart from one location to another location in a warehouse or shipping center, for example.

Figure 8:
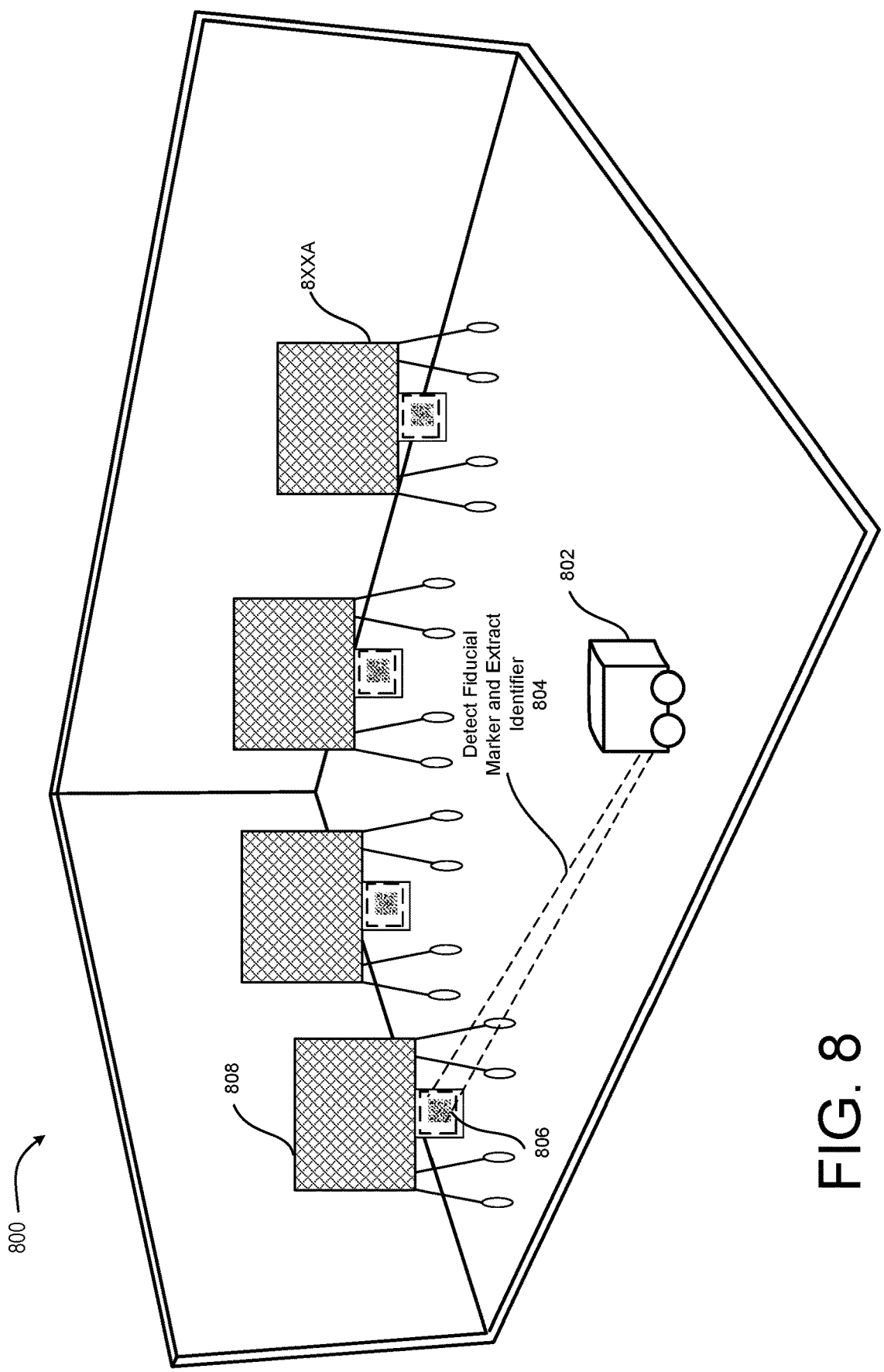
FIG. 8 illustrates an example scenario in which a device (e.g., a robotic device) extracts an identifier from a fiducial marker, displayed via an electronic paper display, to determine a property associated with an IoT device (e.g., a cart storing a particular type of physical object).

FIG. 8 illustrates an example scenario 800 in which a robotic device 802 extracts an identifier 804 from a fiducial marker 806, displayed via an electronic paper display on an IoT "cart" device 808. In this example, the identifier 804 can be associated with a property of the IoT "cart" device 808, such as a type of object being stored in the cart. The identifier may be dynamically assigned to the IoT "cart" device 808 by a management system. Consequently, the robotic device 802 can use the identifier to locate a cart with the correct types of object. The robotic device 802 can then dock with the cart and move the cart to a predetermined location in a warehouse or shipping center, for example.

In various embodiments, the robotic device 802 can determine, based on a known shape and a known size of a target point configured within the fiducial marker, an orientation and a position of IoT "cart" device 808. The robotic device 802 can use the orientation and the position of the IoT "cart" device 808 to dock with the IoT "cart" device 808.

Figure 9:
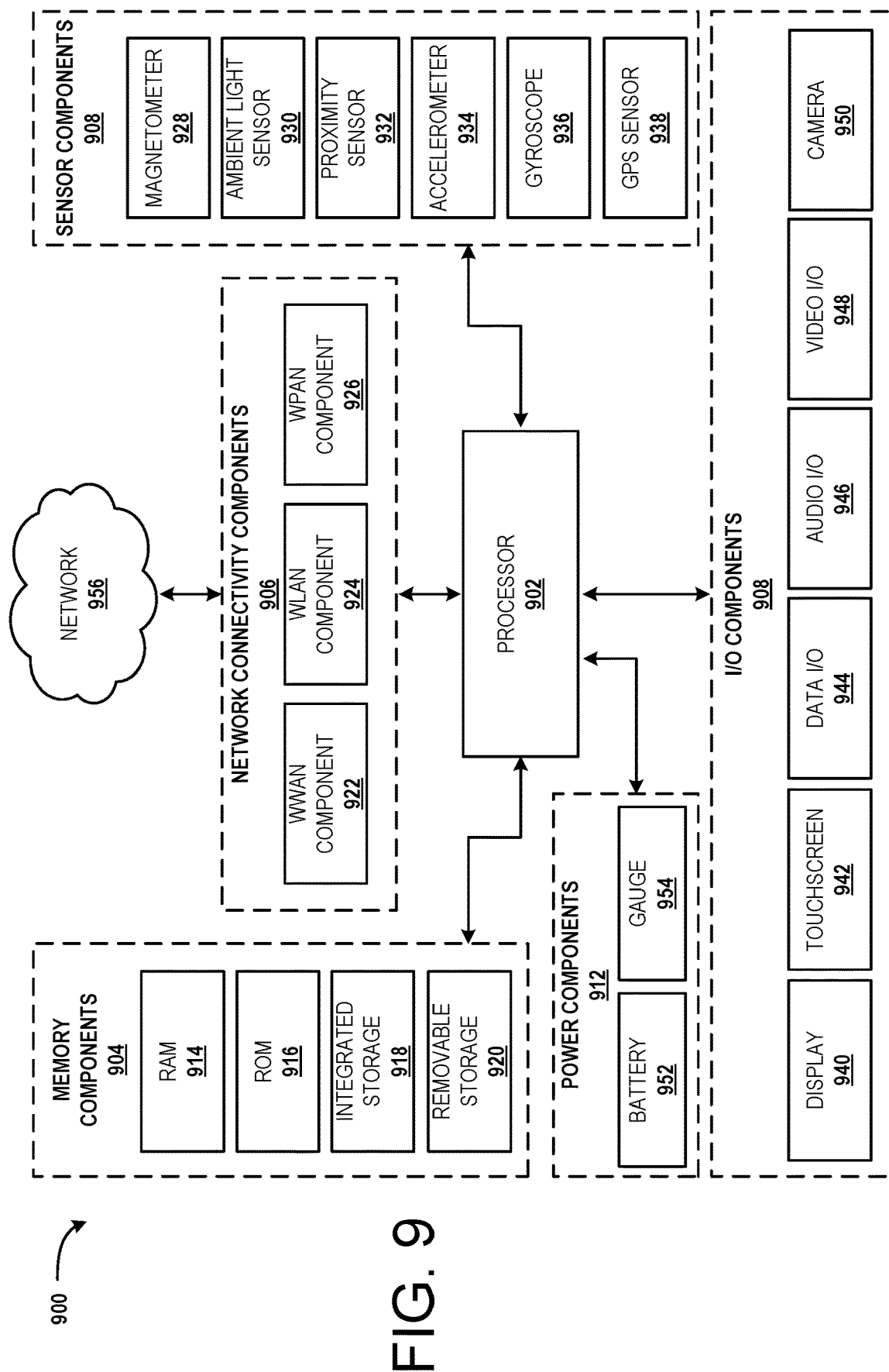
FIG. 9 is a computing architecture diagram showing aspects of the configuration and operation of a computing device that can implement aspects of the techniques disclosed herein.

FIG. 9 illustrates a computing device architecture 900 for a computing device that is capable of executing various software components described herein. The computing device architecture 900 is applicable to computing devices that facilitate mobile computing due, in part, to form factor, wireless connectivity, and/or battery-powered operation. In some configurations, the computing devices include, but are not limited to, head-mounted display devices, mobile telephone devices, tablet devices, slate devices, portable video game devices, and the like.

The computing device architecture 900 includes a processor 902, memory components 904, network connectivity components 906, sensor components 908, input/output components 910, and power components 912. In the illustrated configuration, the processor 902 is in communication with the memory components 904, the network connectivity components 906, the sensor components 908, the input/output ("I/O") components 910, and the power components 912.

The processor 902 may include a central processing unit ("CPU") configured to process data, execute computer-executable instructions of one or more application programs, and communicate with other components of the computing device architecture 900 in order to perform various functionality described herein. The processor 902 may be utilized to execute aspects of the software components presented herein.

In some configurations, the processor 902 includes a graphics processing unit ("GPU") configured to accelerate operations performed by the CPU, including, but not limited to, operations performed by executing general-purpose scientific and/or engineering computing applications, as well as graphics-intensive computing applications such as high resolution video (e.g., 720P, 1080P, and higher resolution), video games, three-dimensional ("3D") modeling applications, and the like. In some configurations, the CPU and GPU may be configured in accordance with a co-processing CPU/GPU computing model, wherein the sequential part of an application executes on the CPU and the computationally-intensive part is accelerated by the GPU.

In some configurations, the processor 902 is, or is included in, a system-on-chip ("SoC") along with one or more of the other components described herein. For example, the SoC may include the processor 902, a GPU, one or more of the network connectivity components 906, and one or more of the sensor components 908. In some configurations, the processor 902 is fabricated, in part, utilizing a package-on-package ("PoP") integrated circuit packaging technique. The processor 902 may be a single core or multi-core processor.

The memory components 904 include a random access memory ("RAM") 914, a read-only memory ("ROM") 916, an integrated storage memory ("integrated storage") 918, and a removable storage memory ("removable storage") 920. In some configurations, the RAM 914 or a portion thereof, the ROM 916 or a portion thereof, and/or some combination the RAM 914 and the ROM 916 is integrated in the processor 902. In some configurations, the ROM 916 is configured to store a firmware, an operating system or a portion thereof (e.g., operating system kernel), and/or a bootloader to load an operating system kernel from the integrated storage 918 and/or the removable storage 920.

The integrated storage 918 can include a solid-state memory, a hard disk, or a combination of solid-state memory and a hard disk. The integrated storage 918 may be soldered or otherwise connected to a logic board upon which the processor 902 and other components described herein also may be connected. The integrated storage 918 may be configured to store an operating system or portions thereof, application programs, data, and other software components described herein.

The removable storage 920 can include a solid-state memory, a hard disk, or a combination of solid-state memory and a hard disk. In some configurations, the removable storage 920 is provided in lieu of the integrated storage 918. In other configurations, the removable storage 920 is provided as additional optional storage. In some configurations, the removable storage 920 is logically combined with the integrated storage 918 such that the total available storage is made available as a total combined storage capacity. In some configurations, the total combined capacity of the integrated storage 918 and the removable storage 920 is shown to a user instead of separate storage capacities for the integrated storage 918 and the removable storage 920.

The removable storage 920 is configured to be inserted into a removable storage memory slot or other mechanism by which the removable storage 920 is inserted and secured to facilitate a connection over which the removable storage 920 can communicate with other components of the computing device, such as the processor 902. The removable storage 920 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

The network connectivity components 906 include a wireless wide area network component ("WWAN component") 922, a wireless local area network component ("WLAN component") 924, and a wireless personal area network component ("WPAN component") 926. The network connectivity components 906 facilitate communications to and from the network 956 or another network, which may be a WWAN, a WLAN, or a WPAN. Although only the network 956 is illustrated, the network connectivity components 906 may facilitate simultaneous communication with multiple networks, including the network 414 in FIG. 4. For example, the network connectivity components 906 may facilitate simultaneous communications with multiple networks via one or more of a WWAN, a WLAN, or a WPAN.

The network 956 may be or may include a WWAN, such as a mobile telecommunications network utilizing one or more mobile telecommunications technologies to provide voice and/or data services to a computing device utilizing the computing device architecture 900 via the WWAN component 922.

The network 956 may be a WLAN operating in accordance with one or more Institute of Electrical and Electronic Engineers ("IEEE") 802.11 standards, such as IEEE 802.11a, 802.11b, 802.11g, 802.11n, and so forth (referred to herein collectively as Wi-Fi). In some configurations, the WLAN is implemented utilizing one or more wireless Wi-Fi access points. In some configurations, one or more of the wireless Wi-Fi access points are another computing device with connectivity to a WWAN that are functioning as a Wi-Fi hotspot. The WLAN component 924 is configured to connect to the network 956 via the WI-FI access points. Such connections may be secured via various encryption technologies including, but not limited to, Wi-Fi Protected Access ("WPA"), WPA2, Wired Equivalent Privacy ("WEP"), and the like.

The network 956 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 926 is configured to facilitate communications with other devices (e.g., IoT devices) via the WPAN.

The sensor components 908 include a magnetometer 928, an ambient light sensor 930, a proximity sensor 932, an accelerometer 934, a gyroscope 936, and a Global Positioning System sensor ("GPS sensor") 938. It is contemplated that other sensors, such as, but not limited to, temperature sensors or shock detection sensors, also may be incorporated in the computing device architecture 900.

The magnetometer 928 is configured to measure the strength and direction of a magnetic field. In some configurations, the magnetometer 928 provides measurements to a compass application program stored within one of the memory components 904 in order to provide a user with accurate directions in a frame of reference including the cardinal directions, north, south, east, and west. Similar measurements may be provided to a navigation application program that includes a compass component.

The ambient light sensor 930 is configured to measure ambient light. In some configurations, the ambient light sensor 930 provides measurements to an application program stored within one the memory components 904 in order to automatically adjust the brightness of a display to compensate for low-light and high-light environments.

The proximity sensor 932 is configured to detect the presence of an object or thing in proximity to the computing device without direct contact. In some configurations, the proximity sensor 932 detects the presence of a user's body (e.g., the user's face) and provides this information to an application program stored within one of the memory components 904 that utilizes the proximity information to enable or disable some functionality of the computing device. For example, a telephone application program may automatically disable a touchscreen in response to receiving the proximity information so that the user's face does not inadvertently end a call or enable/disable other functionality within the telephone application program during the call.

The accelerometer 934 is configured to measure proper acceleration. In some configurations, output from the accelerometer 934 is used by an application program as an input mechanism to control some functionality of the application program. For example, the application program may be a video game in which a character, a portion thereof, or an object is moved or otherwise manipulated in response to input received via the accelerometer 934. In some configurations, output from the accelerometer 934 is provided to an application program for use in switching between landscape and portrait modes, calculating coordinate acceleration, or detecting a fall.

The gyroscope 936 is configured to measure and maintain orientation. In some configurations, output from the gyroscope 936 is used by an application program as an input mechanism to control some functionality of the application program. For example, the gyroscope 936 can be used for accurate recognition of movement within a 3D environment of a video game application or some other application. In some configurations, an application program utilizes output from the gyroscope 936 and the accelerometer 934 to enhance control of some functionality of the application program.

The GPS sensor 938 is configured to receive signals from GPS satellites for use in calculating a location. The location calculated by the GPS sensor 938 may be used by any application program that requires or benefits from location information. For example, the location calculated by the GPS sensor 938 may be used with a navigation application program to provide directions from the location to a destination or directions from the destination to the location. The GPS sensor 938 may obtain location information generated via WI-FI, WIMAX, and/or cellular triangulation techniques utilizing one or more of the network connectivity components 906 to aid the GPS sensor 938 in obtaining a location fix.

The I/O components 910 include a display 940, a touchscreen 942, a data I/O interface component ("data I/O") 944, an audio I/O interface component ("audio I/O") 946, a video I/O interface component ("video I/O") 948, and a camera 950. In some configurations, the display 940 and the touchscreen 942 are combined. In some configurations two or more of the data I/O component 944, the audio I/O component 946, and the video I/O component 948 are combined. The I/O components 910 may include discrete processors configured to support the various interfaces described below, or may include processing functionality built-in to the processor 902.

The display 940 is an output device configured to present information in a visual form. In particular, the display 940 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 940 is a liquid crystal display ("LCD") utilizing any active or passive matrix technology and any backlighting technology (if used). In some configurations, the display 940 is an organic light emitting diode ("OLED") display.

The touchscreen 942, also referred to herein as a "touch-enabled screen," is an input device configured to detect the presence and location of a touch. The touchscreen 942 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some configurations, the touchscreen 942 is incorporated on top of the display 940 as a transparent layer to enable a user to use one or more touches to interact with objects or other information presented on the display 940. In other configurations, the touchscreen 942 is a touch pad incorporated on a surface of the computing device that does not include the display 940.

The data I/O interface component 944 is configured to facilitate input of data to the computing device and output of data from the computing device. In some configurations, the data I/O interface component 944 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 946 is configured to provide audio input and/or output capabilities to the computing device. In some configurations, the audio I/O interface component 946 includes a microphone configured to collect audio signals. In some configurations, the audio I/O interface component 946 includes a headphone jack configured to provide connectivity for headphones or other external speakers. In some configurations, the audio I/O interface component 946 includes a speaker for the output of audio signals. In some configurations, the audio I/O interface component 1046 includes an optical audio cable out.

The video I/O interface component 948 is configured to provide video input and/or output capabilities to the computing device. In some configurations, the video I/O interface component 948 includes a video connector configured to receive video as input from another device or send video as output to another device (e.g., a monitor, a television, or some other external display). In some configurations, the video I/O interface component 948 includes a High-Definition Multimedia Interface ("HDMI"), mini-HDMI, micro-HDMI, DisplayPort, or proprietary connector to input/output video content. In some configurations, the video I/O interface component 948 or portions thereof is combined with the audio I/O interface component 1046 or portions thereof.

The camera 950 can be configured to capture still images and/or video. The camera 950 may utilize a charge coupled device ("CCD") or a complementary metal oxide semiconductor ("CMOS") image sensor to capture images. In some configurations, the camera 950 includes a flash to aid in taking pictures in low-light environments. Settings for the camera 950 may be implemented as hardware or software buttons.

The illustrated power components 912 include one or more batteries 952, which can be connected to a battery gauge 954. The batteries 952 may be rechargeable or disposable. Rechargeable battery types include, but are not limited to, lithium polymer, lithium ion, nickel cadmium, and nickel metal hydride. Each of the batteries 952 may be made of one or more cells.

The battery gauge 954 can be configured to measure battery parameters such as current, voltage, and temperature. In some configurations, the battery gauge 954 is configured to measure the effect of a battery's discharge rate, temperature, age and other factors to predict remaining life within a certain percentage of error. In some configurations, the battery gauge 954 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 912 may also include a power connector, which may be combined with one or more of the aforementioned I/O components 910. The power components 912 may interface with an external power system or charging equipment via an I/O component.

The disclosure presented herein also encompasses the subject matter set forth in the following clauses.

Example Clause A, a head-mounted display device comprising: an image capture device; an interface configured to establish a network connection; at least one processing unit; and memory storing instructions that, when executed by the at least one processing unit, cause the head-mounted display device to perform operations comprising: detecting, by the image capture device, a fiducial marker displayed via an electronic paper display connected to an Internet of Things (IoT) device located in an environment that contains a plurality of IoT devices; extracting an identifier for the IoT device from the fiducial marker; using the identifier for the IoT device to establish the network connection with the IoT device via the interface; obtaining, via the network connection, a property of the IoT device; and displaying data in association with the IoT device on the display based at least in part on the property of the IoT device.

Example Clause B, the head-mounted display device of Example Clause A, wherein the operations further comprise: determining, based on a known shape and a known size of a target point configured within the fiducial marker, an orientation and a position of the IoT device in the environment relative to the head-mounted display device; and using the orientation and the position of the IoT device in the environment relative to the head-mounted display device to display the data in association with the IoT device.

Example Clause C, the head-mounted display device of Example Clause A or Example Clause B, wherein the property of the IoT device is indicative of a task being performed by the IoT device.

Example Clause D, the head-mounted display device of Example Clause A or Example Clause B, wherein the property of the IoT device is indicative of an operating status of the IoT device.

Example Clause E, the head-mounted display device of any one of Example Clauses A through D, wherein the identifier comprises one of a cloud IoT identifier, an Internet Protocol (IP) address, or a Bluetooth address.

Example Clause F, the head-mounted display device of any one of Example Clauses A through E, wherein the IoT device comprises a robot that is configured to move within the environment.

Example Clause G, the head-mounted display device of any one of Example Clauses A through F, wherein the fiducial marker comprises a Quick Response (QR) code.

Example Clause H, a device comprising: an image capture device; an interface configured to establish a network connection; at least one processing unit; and memory storing instructions that, when executed by the at least one processing unit, cause the device to perform operations comprising: detecting, by the image capture device, a fiducial marker displayed via an electronic paper display connected to an Internet of Things (IoT) device located in an environment that contains a plurality of IoT devices, wherein the electronic paper display is configured to dynamically change the fiducial marker; extracting a temporary identifier for the IoT device from the fiducial marker; and associating the temporary identifier with a property of the IoT device.

Example Clause I, the device of Example Clause H, wherein the property of the IoT device is indicative of a task being performed by the IoT device.

Example Clause J, the device of Example Clause H, wherein the property of the IoT device is indicative of a type of physical object being stored in the IoT device.

Example Clause K, the device of Example Clause H, wherein the property of the IoT device is indicative of an operating status of the IoT device.

Example Clause L, the device of any one of Example Clauses H through K, wherein the temporary identifier comprises one of a cloud IoT identifier, an Internet Protocol (IP) address, or a Bluetooth address.

Example Clause M, the device of any one of Example Clauses H through L, wherein the device comprises a robot that is configured to move within the environment and the IoT device comprises a cart configured to store physical objects.

Example Clause N, the device of Example Clause M, wherein the operations further comprise: determining, based on a known shape and a known size of a target point configured within the fiducial marker, an orientation and a position of the cart in the environment relative to the robot; and using the orientation and the position of the cart in the environment relative to the robot to dock the robot with the cart.

Example Clause O, the device of any one of Example Clauses H through N, wherein the fiducial marker comprises a Quick Response (QR) code.

Example Clause P, a method comprising: dynamically determining, by a processing unit at a first time, a first identifier for an Internet of Things (IoT) device; encoding the first identifier for the IoT device in a first fiducial marker; displaying the first fiducial marker via an electronic paper display connected to the IoT device; dynamically determining, by the processing unit at a second time that is after the first time, a second identifier for the IoT device that is different than the first identifier for the IoT device; encoding the second identifier for the IoT device in a second fiducial marker that is different than the first fiducial marker; and replacing the first fiducial marker displayed via the electronic paper display connected to the IoT device with the second fiducial marker.

Example Clause Q, the method of Example Clause P, wherein the dynamic determination of the second identifier is based on at least one of an expired lease for the first identifier, a power cycle of the IoT device, a sleep/wake cycle of the IoT device, or a change in networks or network equipment used by the IoT device.

Example Clause R, the method of Example Clause P or Example Clause Q, wherein each of the first identifier and the second identifier comprises one of a cloud IoT identifier, an Internet Protocol (IP) address, or a Bluetooth address.

Example Clause S, the method of any one of Example Clauses P through R, wherein each of the first fiducial marker and the second fiducial marker comprises at a Quick Response (QR) code.

Example Clause T, the method of any one of Example Clauses P through S, further comprising: receiving a request from a device to connect using the second identifier; and establishing a network connection with the device using the second identifier.

The terms "a," "an," "the" and similar referents used in the context of describing the invention (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

It should be appreciated that any reference to "first," "second," etc. users or other elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different users, two different computing devices, etc.).

It is to be appreciated that conditional language used herein such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

It should also be appreciated that many variations and modifications may be made to the above-described examples, the elements of which are to be understood as being among other acceptable examples. All such modifications and variations are intended to be included herein within the scope of this disclosure and protected by the following claims.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:
1. A device comprising:
an image capture device;
at least one processing unit; and
memory storing instructions that, when executed by the at least one processing unit, cause the device to perform operations comprising:
detecting, by the image capture device, a fiducial marker displayed via an electronic paper display connected to an Internet of Things (IoT) device located in an environment that contains a plurality of IoT devices, wherein the electronic paper display is configured to dynamically change the fiducial marker;
extracting a temporary identifier for the IoT device from the fiducial marker, wherein the temporary identifier references a source external to the IoT device that stores a property of the IoT device; and accessing the source referenced by the temporary identifier to obtain the property of the IoT device without connecting to the IoT device.

2. The device of claim 1, wherein the property of the IoT device is indicative of a task being performed by the IoT device.

3. The device of claim 1, wherein the property of the IoT device is indicative of a type of physical object being stored in the IoT device.

4. The device of claim 1, wherein the property of the IoT device is indicative of an operating status of the IoT device.

5. The device of claim 1, wherein the temporary identifier comprises one of a cloud IoT identifier, an Internet Protocol (IP) address, or a Bluetooth address.

6. The device of claim 1, wherein the device comprises a robot that is configured to move within the environment and the IoT device comprises a cart configured to store physical objects.

7. The device of claim 6, wherein the operations further comprise:
- determining, based on a known shape and a known size of a target point configured within the fiducial marker, an orientation and a position of the cart in the environment relative to the robot; and
- using the orientation and the position of the cart in the environment relative to the robot to dock the robot with the cart.

8. The device of claim 1, wherein the fiducial marker comprises a Quick Response (QR) code.

9. The device of claim 1, wherein the IoT device is not configured to communicate with the device.

10. A method implemented by a device, comprising:
- detecting, by an image capture device, a fiducial marker displayed via an electronic paper display connected to an Internet of Things (IoT) device located in an environment that contains a plurality of IoT devices, wherein the electronic paper display is configured to dynamically change the fiducial marker;
- extracting, by a processing unit of the device, a temporary identifier for the IoT device from the fiducial marker, wherein the temporary identifier references a source external to the IoT device that stores a property of the IoT device; and
- accessing the source referenced by the temporary identifier to obtain the property of the IoT device without connecting to the IoT device.

11. The method of claim 10, wherein the property of the IoT device is indicative of a task being performed by the IoT device.

12. The method of claim 10, wherein the property of the IoT device is indicative of a type of physical object being stored in the IoT device.

13. The method of claim 10, wherein the property of the IoT device is indicative of an operating status of the IoT device.

14. The method of claim 10, wherein the temporary identifier comprises one of a cloud IoT identifier, an Internet Protocol (IP) address, or a Bluetooth address.

15. The method of claim 10, wherein the device comprises a robot that is configured to move within the environment and the IoT device comprises a cart configured to store physical objects.

16. The method of claim 15, further comprising:
- determining, based on a known shape and a known size of a target point configured within the fiducial marker, an orientation and a position of the cart in the environment relative to the robot; and
- using the orientation and the position of the cart in the environment relative to the robot to dock the robot with the cart.

17. The method of claim 10, wherein the fiducial marker comprises a Quick Response (QR) code.

18. The method of claim 10, wherein the IoT device is not configured to communicate with the device.

19. One or more computer storage media comprising instructions that, when executed by a processing unit, cause a device to perform operations comprising:
- detecting a fiducial marker displayed via an electronic paper display connected to an Internet of Things (IoT) device located in an environment that contains a plurality of IoT devices, wherein the electronic paper display is configured to dynamically change the fiducial marker;
- extracting a temporary identifier for the IoT device from the fiducial marker, wherein the temporary identifier references a source external to the IoT device that stores a property of the IoT device; and
- accessing the source referenced by the temporary identifier to obtain the property of the IoT device without connecting to the IoT device.

20. The one or more computer storage media of claim 19, wherein the property of the IoT device is indicative of at least one of:
- a task being performed by the IoT device;
- a type of physical object being stored in the IoT device; or
- an operating status of the IoT device.

* * * * *